April 3, 1973     D. G. CRAMER     3,725,028
WINDOW STRUCTURE
Filed Oct. 1, 1971
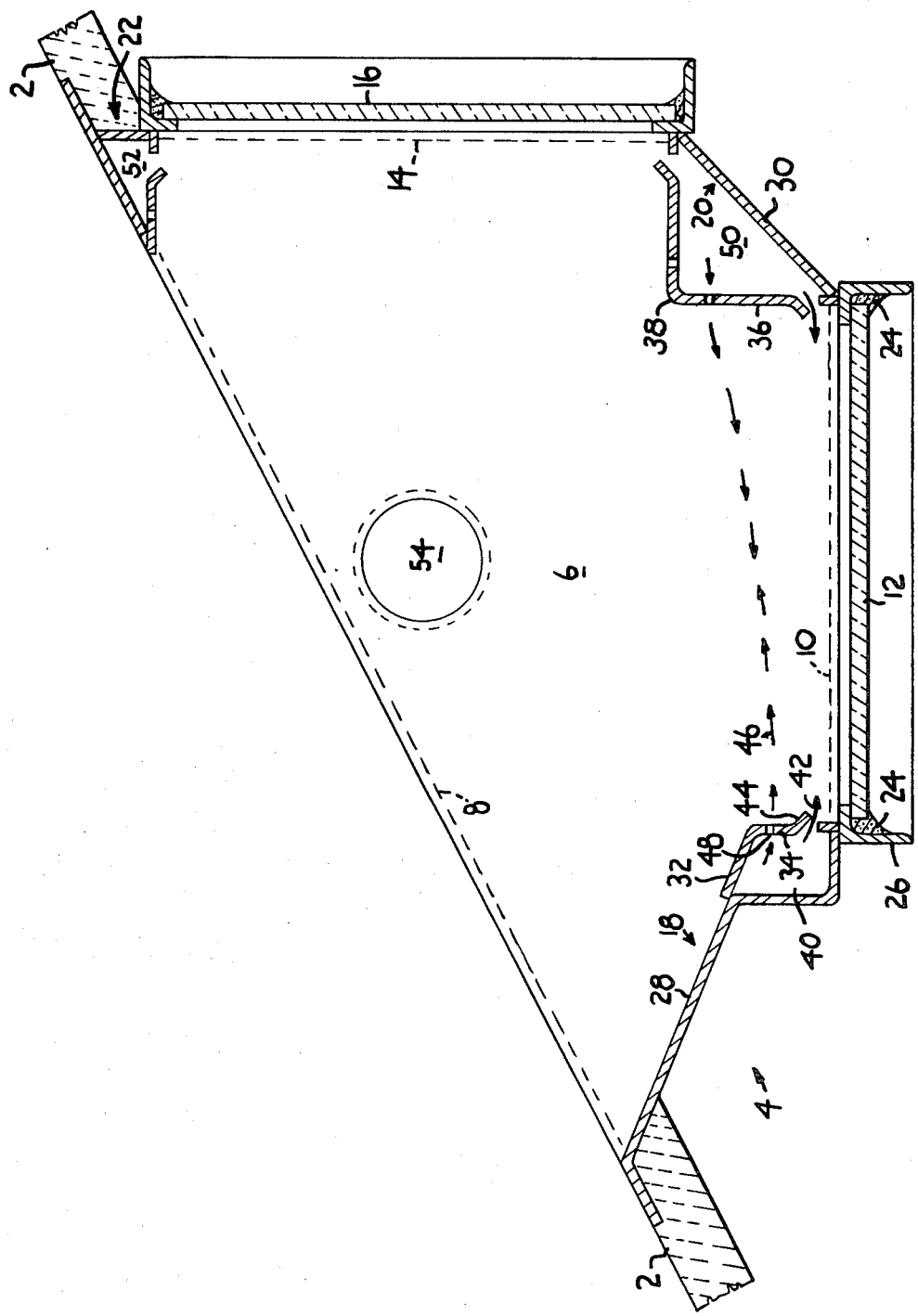
INVENTOR
DEANE G. CRAMER
ATTORNEYS United States Patent Office 3,725,028
Patented Apr. 3, 1973

3,725,028
WINDOW STRUCTURE
Deane G. Cramer, Festus, Mo., assignor to PPG
Industries, Inc., Pittsburgh, Pa.
Filed Oct. 1, 1971, Ser. No. 185,499
Int. Cl. C03b 18/00
U.S. Cl. 65—182 R                                    4 Claims

ABSTRACT OF THE DISCLOSURE

Disclosed is a float-bath window structure that yields long-term clear viewing upbath and downbath from its location. The structure comprises first and second panes set at about 90 degrees with respect to each other, first sets of gas-outlet slots near the panes having vanes to direct gas against the glass, and second sets of slot outlets for gas to create second sets of gas curtains parallel to the glass of the panes.

BACKGROUND OF INVENTION (1) Field of the invention

This invention relates to windows useful in glass manufacturing equipment, and in particular to windows for a float-bath.

(2) Description of the prior art

In the manufacture of flat glass by the float process, as in U.S. Pat. No. 3,083,551, there is the problem of providing window means to permit adequate viewing of the operation, so that it may be controlled. Those skilled in the art are aware how, unless measures are taken, vapors of tin or tin compounds in the bath headspace atmosphere deposit on the window and obscure the view in a short time, a few hours or days. U.S. Pat. Nos. 3,473,905 and 3,387,551 teach window structures that are addressed to the above problem, but it will be apparent that they do not furnish all the advantages of the structure according to the instant invention.

DESCRIPTION OF DRAWING

A complete understanding of the invention may be obtained from the foregoing and following description thereof, taken in conjunction with the appended figure, which is a schematic sectional plan view taken through a window constructed in accordance with the instant invention.

DESCRIPTION OF PREFERRED EMBODIMENT

In the figure, the float-bath wall is indicated at 2. The window structure 4 is set within a suitable opening in the wall 2, and preferably in a side wall, near its top so that the viewing is not obstructed by the edge rolls and similar hardware. The structure comprises a floor piece 6 having the general shape shown; a long side 8 paralleling the wall 2, a side 10 paralleling a first pane 12, a side 14 paralleling a second pane 16 that is at about a right angle with respect to the pane 12, and sides or edges 18, 20, and 22 that join the others mentioned above. Not shown is a substantially congruent roof piece. As shown, the pane 12 is set in suitably heat-resisting sealant 24 within a flange or angle member 26 that is affixed on one side to a first side member 28 that rises from the edge 18, joining the floor piece 6 and the roof piece, and is affixed on the other side to a second side member 30 similarly rising from the side or edge 20. The pane 16 is set substantially similarly. Panes 12 and 16 are preferably made of wire glass.

Upstanding members of particular shape are provided so that gas is supplied to the window structure in a desired manner, i.e., such that vanes direct gas against the glass while other slots more remote from the glass of the pane direct their gas parallel to its glass. Thus to this end there are provided near the pane 12 the upstanding member 32, 34, 36, and 38. Members 32 and 34 form with member 28 a chamber 40, from which, as indicated by the arrow 42, there issues gas against the glass of the pane 12, owing to the shape of the edge 44 of the member 34 (edge 44 acting as a vane), while at the same time, as indicated by the arrow 46, other gas issues through the slot 48 substantially parallel to the glass of the pane 12. The other chambers 50 and 52 have, as will be seen, similar opening and a similar mode of operation. There is also provided an exhaust part 54 in the piece 6.

Suitable gas, such as dry nitrogen, pure or containing perhaps 1 to 10 percent of hydrogen, is fed to the chambers 40, 50 and 52. For a structure containing two windows about 5 inches by 7 inches, satisfactory results are obtained with a gas-flow rate of approximately 350 standard cubic feet per hour. Such a structure has given over three months of clear viewing without a change of the glass of the panes 12 and 16. The viewing may be done either by video means or by a human observer.

I claim as my invention:

1. A window structure for a glass-manufacturing apparatus, said structure comprising
    frame means in sealing relationship with an opening in a side wall of said apparatus;
    a first pane of glass extending vertically and mounted in said frame means at an angle with respect to said side wall;
    a second pane of glass extending vertically and mounted in said frame means in a location substantially at right angles with respect to said first pane;
    first and second means within said structure for directing gas as first and second curtains against the glass of said first and second panes;
    and third and fourth means more remote from said first and second panes than said first and second means, for directing gas as third and fourth curtains located substantially parallel respectively to said first and second panes of glass.

2. A structure as defined in claim 1, characterized in that said glass-manufacturing apparatus is the bath of a float-glass line.

3. A structure as defined in claim 1, characterized in that it comprises exhaust means located between the said third and fourth curtains and a headspace of said glass-manufacturing apparatus.

4. A structure as defined in claim 3, characterized in that said glass-manufacturing apparatus is the bath of a float-glass line.

References Cited

UNITED STATES PATENTS 3,473,905    10/1969    Jago et al.    _____ 65—27

S. LEON BASHORE, Primary Examiner
K. M. SCHOR, Assistant Examiner

U.S. Cl. X.R.
98—88; 65—29